United States Patent [19]

Diederich, Jr. et al.

[11] Patent Number: 5,054,387
[45] Date of Patent: Oct. 8, 1991

[54] APPARATUS FOR WRAPPING BALES WITH TWINE

[75] Inventors: Anthony F. Diederich, Jr., Terre Hill; John H. Merritt, New Holland, both of Pa.

[73] Assignee: Ford New Holland, Inc., New Holland, Pa.

[21] Appl. No.: 512,718

[22] Filed: Apr. 23, 1990

[51] Int. Cl.⁵ .................... B65B 63/04; B30B 5/04
[52] U.S. Cl. .......................... 100/5; 56/341; 100/13; 100/87
[58] Field of Search ............... 100/5, 13, 15, 87, 88, 100/89; 56/341, 343

[56] References Cited

U.S. PATENT DOCUMENTS

| | | | |
|---|---|---|---|
| 3,894,484 | 7/1975 | Anstey et al. | 100/13 X |
| 4,024,804 | 5/1977 | Hanson | 100/5 |
| 4,182,235 | 1/1980 | Harig | 100/5 X |
| 4,402,259 | 9/1983 | Viaud | 100/5 |
| 4,649,812 | 3/1987 | Mouret | 100/13 X |
| 4,790,125 | 12/1988 | Merritt, III . | |
| 4,793,249 | 12/1988 | Wellman | 100/13 |
| 4,896,477 | 1/1990 | Wagstaff et al. . | |

FOREIGN PATENT DOCUMENTS

| | | | |
|---|---|---|---|
| 0057122 | 8/1982 | European Pat. Off. | 100/5 |
| 0137882 | 4/1985 | European Pat. Off. | 100/5 |
| 2831315 | 2/1980 | Fed. Rep. of Germany | 100/5 |
| 2146947 | 5/1985 | United Kingdom . | |

Primary Examiner—Harvey C. Hornsby
Assistant Examiner—Stephen F. Gerrity
Attorney, Agent, or Firm—Darrell F. Marquette; Frank A. Seemar; Larry W. Miller

[57] ABSTRACT

Apparatus for wrapping cylindrical bales of crop material with twine includes a feed roller, a knife, and a twine arm connected to an electrical actuator for dispensing twine. The electrical actuator is extendable and retractable in order to cause pivoting movement of the twine arm between a rest position, a twine dispensing position and a twine cutting position. A first link is connected between the electrical actuator and a crank lever, and a second link is connected between the crank lever and the twine arm. Extension of the electrical actuator moves the twine arm from the rest position to the dispensing position and simultaneously results in the feed roller being driven. Retraction of the electrical actuator moves the twine arm from the twine dispensing position toward the twine cutting position while the feed roller continues to be driven. When the electrical actuator is fully retracted, the twine arm is moved into the twine cutting position and the knife is actuated.

5 Claims, 6 Drawing Sheets

APPARATUS FOR WRAPPING BALES WITH TWINE

BACKGROUND OF THE INVENTION

This invention relates generally to round balers for making cylindrical bales of crop material and, in particular, to bale wrapping apparatus for such balers.

U.S. Pat. No. 4,896,477 granted Jan. 30, 1990, to Robert A. Wagstaff et al discloses a round baler with wrapping apparatus which is operable to wrap netting material around cylindrical bales. Although it is acceptable in most situations to wrap bales with netting material, it is also desirable to have the option of alternatively wrapping bales with twine. The round baler disclosed in the Wagstaff et al patent has no provision for wrapping bales with twine.

SUMMARY OF THE INVENTION

The present invention provides bale wrapping apparatus which is adapted for use with a round baler and which includes a feed roller and a knife. The bale wrapping apparatus has a feeding position wherein the feed roller is driven while the knife is retracted and a cutting position wherein the feed roller is latched while the knife is actuated. Actuator means are provided for moving the bale wrapping apparatus between its feeding and cutting positions. A twine arm is connected to the actuator means for pivoting movement in order to dispense twine that is fed into the baler by the feed roller. The actuator means is extendable and retractable to cause pivotal movement of the twine arm between a rest position, a twine dispensing position and a twine cutting position. The bale wrapping apparatus also includes a link connected at one end to the actuator means and at the other end to a crank lever. The crank lever is connected to another link which is connected to the twine arm. A spring normally urges the twine arm toward the twine cutting position.

DESCRIPTION OF THE PREFERRED EMBODIMENT

Figure 1:
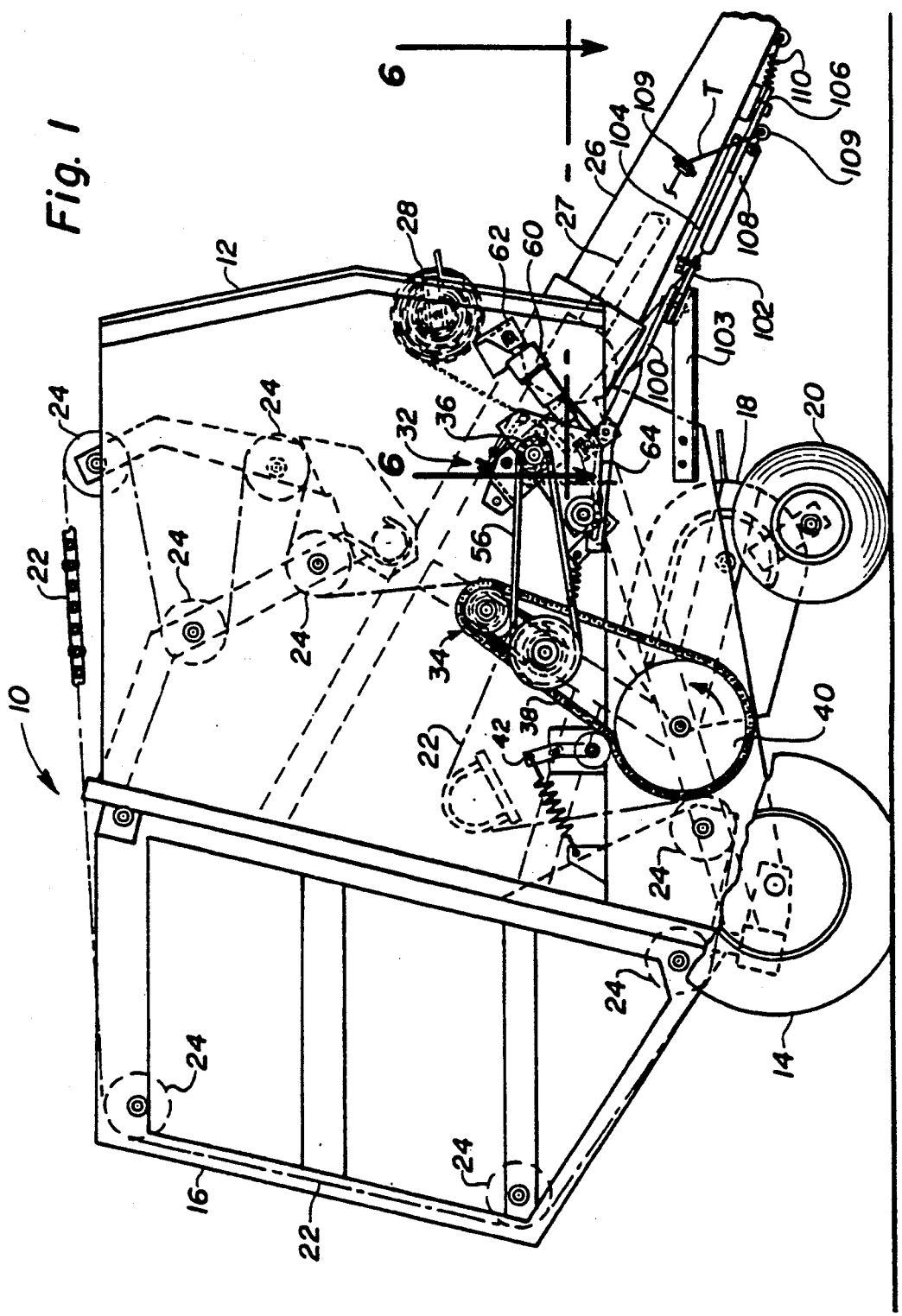
FIG. 1 is a side elevational view of a round baler incorporating bale wrapping apparatus according to the present invention.

Referring to FIG. 1, a round baler 10 generally of the type disclosed in U.S. Pat. No. 4,426,833 includes a main frame 12 supported by a pair of wheels 14, a tailgate 16 pivotally connected to the main frame 12, a pickup 18 pivotally mounted on main frame 12 and supported by a pair of wheels 20. A bale forming apron 22 extends around guide rollers 24 that are rotatably mounted in the main frame 12 and in the tailgate 16. Round baler 10 also includes a tongue 26 for attachment to a tractor (not shown) so that the round baler 10 may be towed across a field to pick up crop material and form it into cylindrical bales.

A supply roll 28 of netting material N is mounted on a spindle 30 rotatably journalled in the main frame 12 in a manner such as disclosed in U.S. Pat. No. 4,768,431 granted Sept. 6, 1988, and incorporated herein by reference. Wrapping apparatus 32 is provided to feed netting material N from the roll 28 so that it may be wrapped circumferentially around bales formed in the round baler 10. Apparatus 32 also serves to cut the netting material once the formed bales have been sufficiently wrapped with approximately 1–2 full revolutions of netting material. Drive means 34 is connected to a feed roller 36 to provide power to the feed roller 36. Power for drive means 34 is supplied by a chain 38 which extends around a sprocket 40 that is driven from a shaft 27 coupled to the PTO of a tractor. Chain 38 is tensioned by a spring loaded idler 42.

Figure 2:
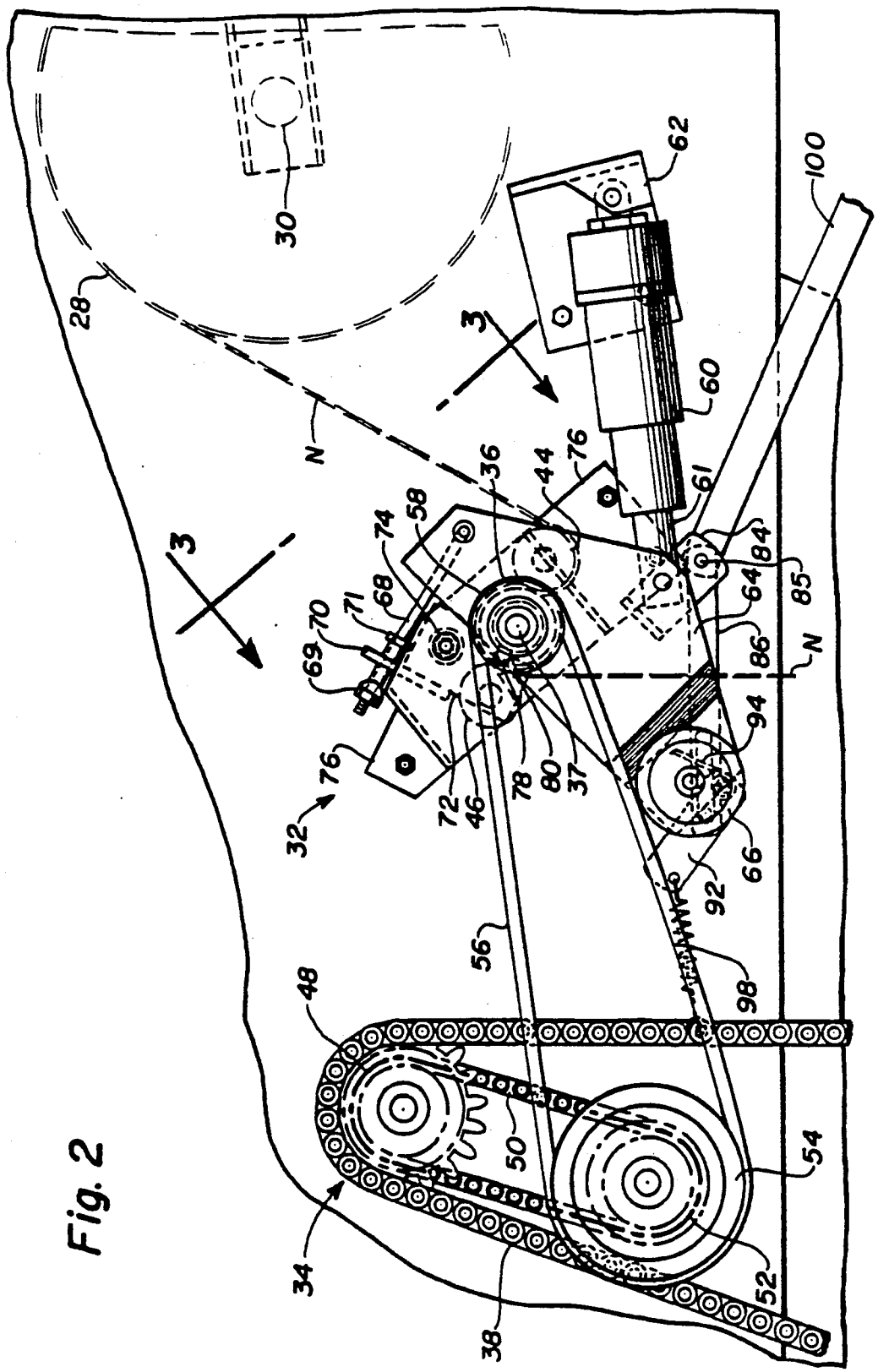
FIG. 2 is an enlarged side elevation view of the bale wrapping apparatus of FIG. 1 in a home or bale forming position.
Figure 3:
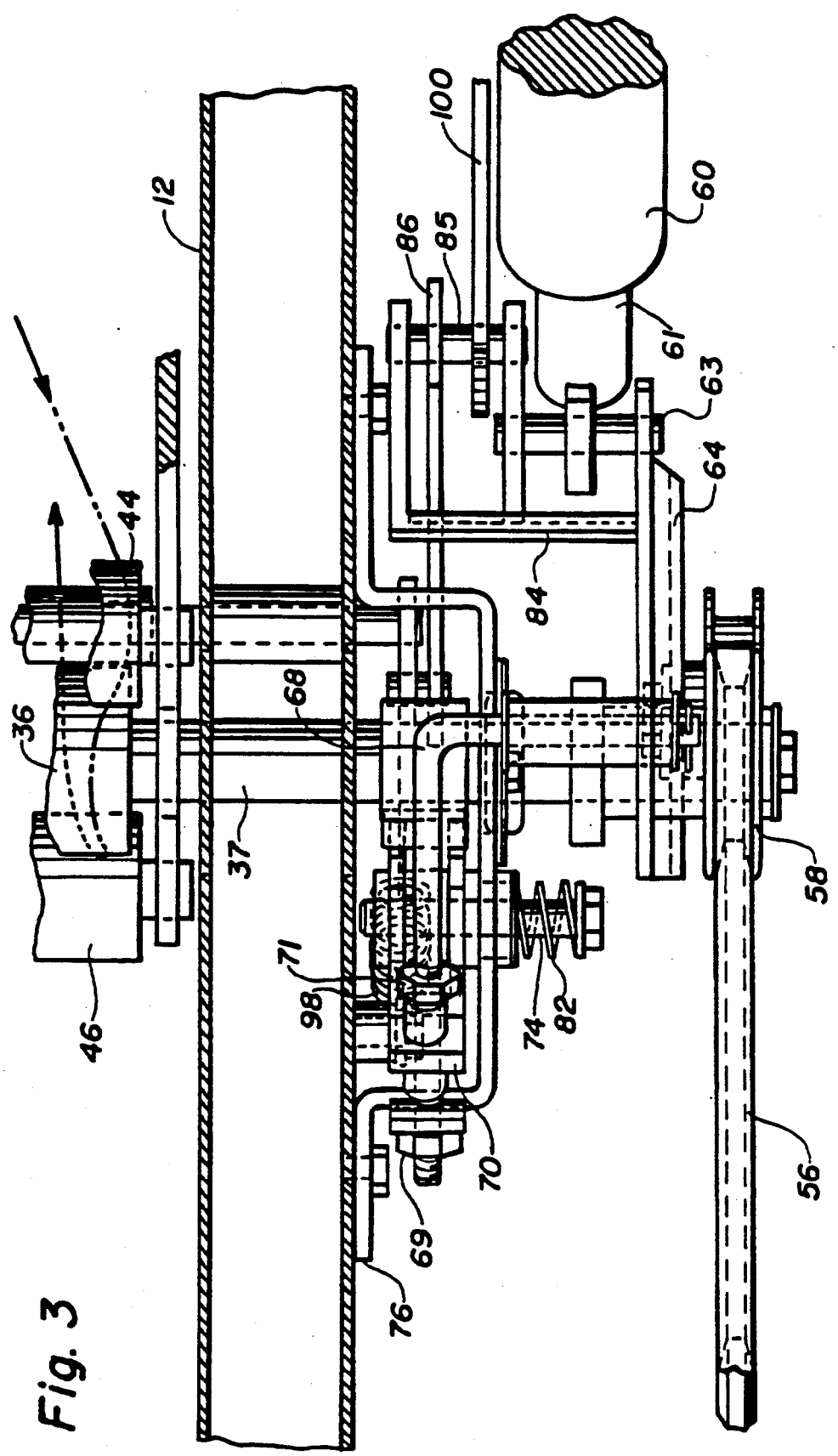
FIG. 3 is a further enlarged sectional view taken along lines 3—3 in FIGS. 2.
Figure 4:
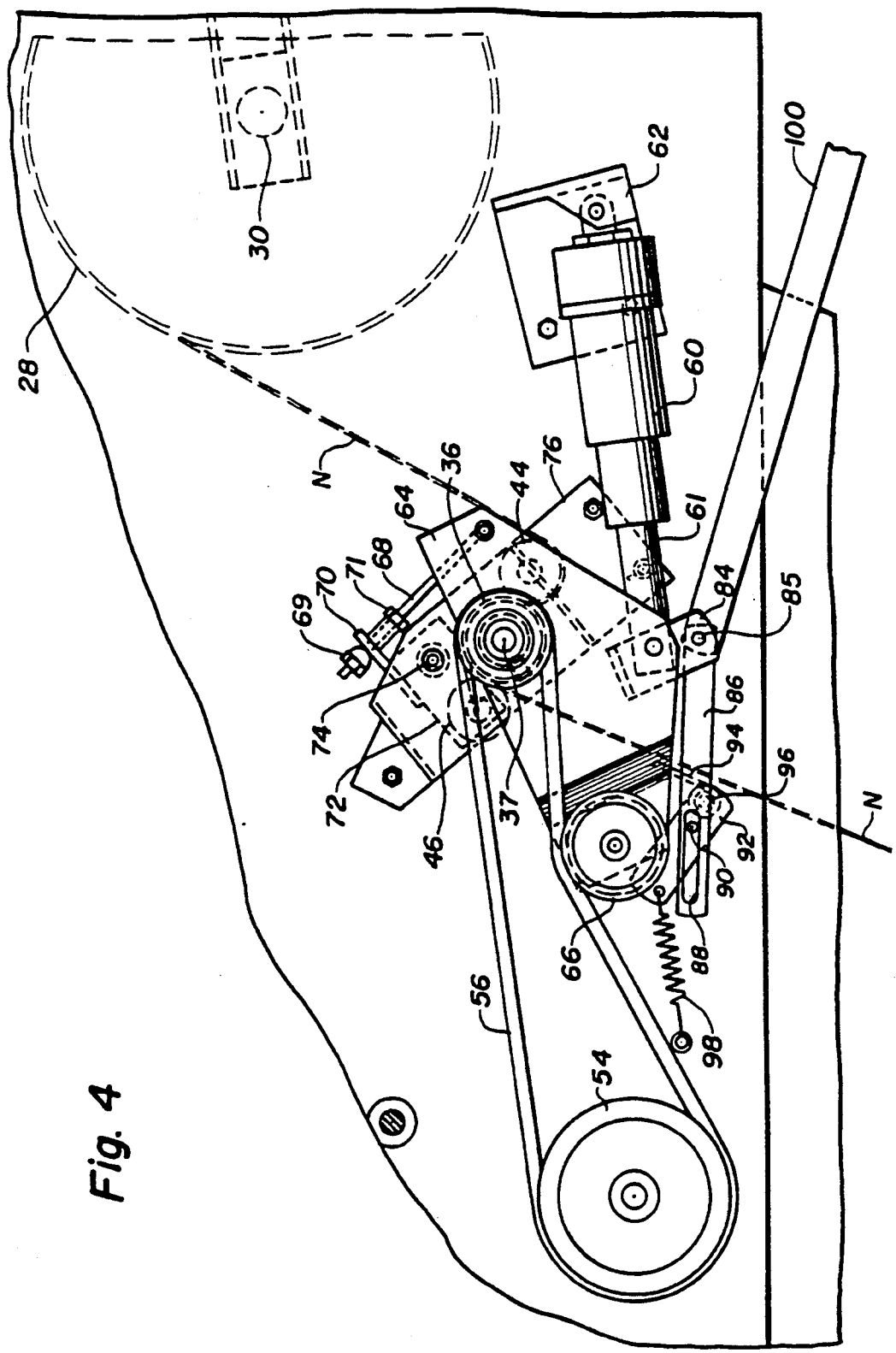
FIG. 4 is an enlarged side elevation view similar to FIG. 2 with the bale wrapping apparatus in a feeding position.

As seen in FIG. 2, apparatus 32 includes the feed roller 36 and a pair of pinch rollers 44, 46 mounted on opposite sides of the feed roller 36 in clamping engagement with the feed roller 36. The netting material N extends from the roll 28 under the pinch roller 44, then upwardly between the pinch roller 44 and the feed roller 36, over the feed roller 36, and then downwardly between the feed roller 36 and the pinch roller 46. A complete description of the manner in which the pinch rollers 44, 46 are moved into and out of clamping engagement with the feed roller 36 is disclosed in U.S. Pat. No. 4,790,125 granted Dec. 13, 1988 to J. H. Merritt, and incorporated herein by reference. Drive means 34 includes a double sprocket 48 driven by chain 38, another chain 50 connected between double sprocket 48 and a sprocket 52, a pulley 54 fixed to the sprocket 52, and a belt 56 extending around the pulley 54 and another pulley 58 which is mounted on a shaft 37 of the feed roller 36.

An electrical actuator 60 is pivotally connected at one end to a bracket 62 mounted on the main frame 12. The electrical actuator 60 includes a piston 61 pivoted on a pin 63 carried on a lever 64 which is rotatably mounted on the feed roller shaft 37. An idler pulley 66 is carried on the lower end of the lever 64 for engagement with the belt 56. When the lever 64 and the idler pulley 66 are positioned as shown in FIG. 2, the belt 56 is slackened and no driving power is delivered to the feed roller 36. A rod 68 is carried on the upper end of the lever 64 and extends through a plate 70. A latch arm 72 is rotatably mounted on a shaft 74 which is supported by a bracket 76 bolted to the main frame 12. Plate 70 is fixed to the latch arm 72 for rotational movement therewith. Latch arm 72 has a notch 78 engageable with a key 80 on the feed roller 36 for preventing rotation of the feed roller 36. A compression spring 82 on the shaft 74 provides a frictional mounting arrangement for the latch arm 72.

Referring to FIGS. 2-5, a bracket 84 fixed to the lever 64 is pivotally connected by a pin 85 to a link 86 which has a slot 88 engaged with a pin 90 extending from another link 92. A knife 94 is carried by the link 92, and both the knife 94 and link 92 are rotatably mounted on a shaft 96. Knife 94 is movable between a retracted position shown in FIG. 4 and an operative position shown in FIG. 5. A spring 98 connected to link 92 normally urges the knife 94 into the retracted position.

In operation, wrapping apparatus 32 is in a home or bale forming position illustrated in FIG. 2 during formation of a bale in the round baler 10. With apparatus 32 in this home position, the feed roller 36 is latched by engagement of the notch 78 in the latch arm 72 with the key 80 on the feed roller 36. This latching of the feed roller 36 prevents improper feeding of the netting material N. Also, in the home position of the apparatus 32, the knife 94 is retracted. When a bale has been formed in the round baler 10 and is ready to be wrapped, the electrical actuator 60 is operated to fully extend the piston 61 thereby rotating the lever 64 in a clockwise direction on the shaft 37 until the apparatus 32 is moved from its home position of FIG. 2 into a feeding position illustrated in FIG. 4.

Initial clockwise rotation of the lever 64 causes rod 68 carried on the upper end thereof to be pulled through plate 70 until a cap nut 69 on the rod 68 engages the plate 70. Further clockwise rotation of the lever 64 results in rod 68 rotating the latch arm 72 away from the feed roller 36 so that the notch 78 therein is disengaged from the key 80 on the feed roller 36. The feed roller 36 is unlatched. This further rotation of the lever 64 also moves the idler pulley 66 carried on the lower end thereof into engagement with the belt 56, thereby tightening the belt 56. Driving power is delivered from the pulley 54 to the pulley 58 via the belt 56, and the feed roller 36 is driven to dispense netting material N from the roll 28 into the round baler 10 where it is wrapped circumferentially around a bale. The aforementioned clockwise rotation of the lever 64 does not, however, cause any movement of the knife 94 due to the lost motion connection between the pin 90 on the link 92 and the slot 88 in the link 86.

Once the bale has been wrapped with approximately 1-2 full revolutions of netting material, the electrical actuator 60 is operated to fully retract the piston 61 and thus rotate the lever 64 in a counterclockwise direction so that the pulley 66 is disengaged from the belt 56. This causes slackening of the belt 56 which stops driving power from being delivered to the pulley 58 connected with the feed roller 36. The initial counterclockwise rotation of the lever 64 also causes the rod 68 to be pulled through plate 70 until nut 71 on the rod 68 engages the plate 70. Further counterclockwise rotation of the lever 64 results in rod 68 rotating latch arm 72 toward the feed roller 36 so that the notch 78 therein is engaged with the key 80 on the feed roller 36. This relatches the feed roller 36. The aforementioned counterclockwise rotation of the lever 64 also causes movement of the knife 94 into its operative position to sever the netting material N. The apparatus 32 is now moved to its cutting position shown in FIG. 5. The latching of the feed roller 36 increases the tension on the netting material N so that it is easily cut by the knife 94.

Figure 5:
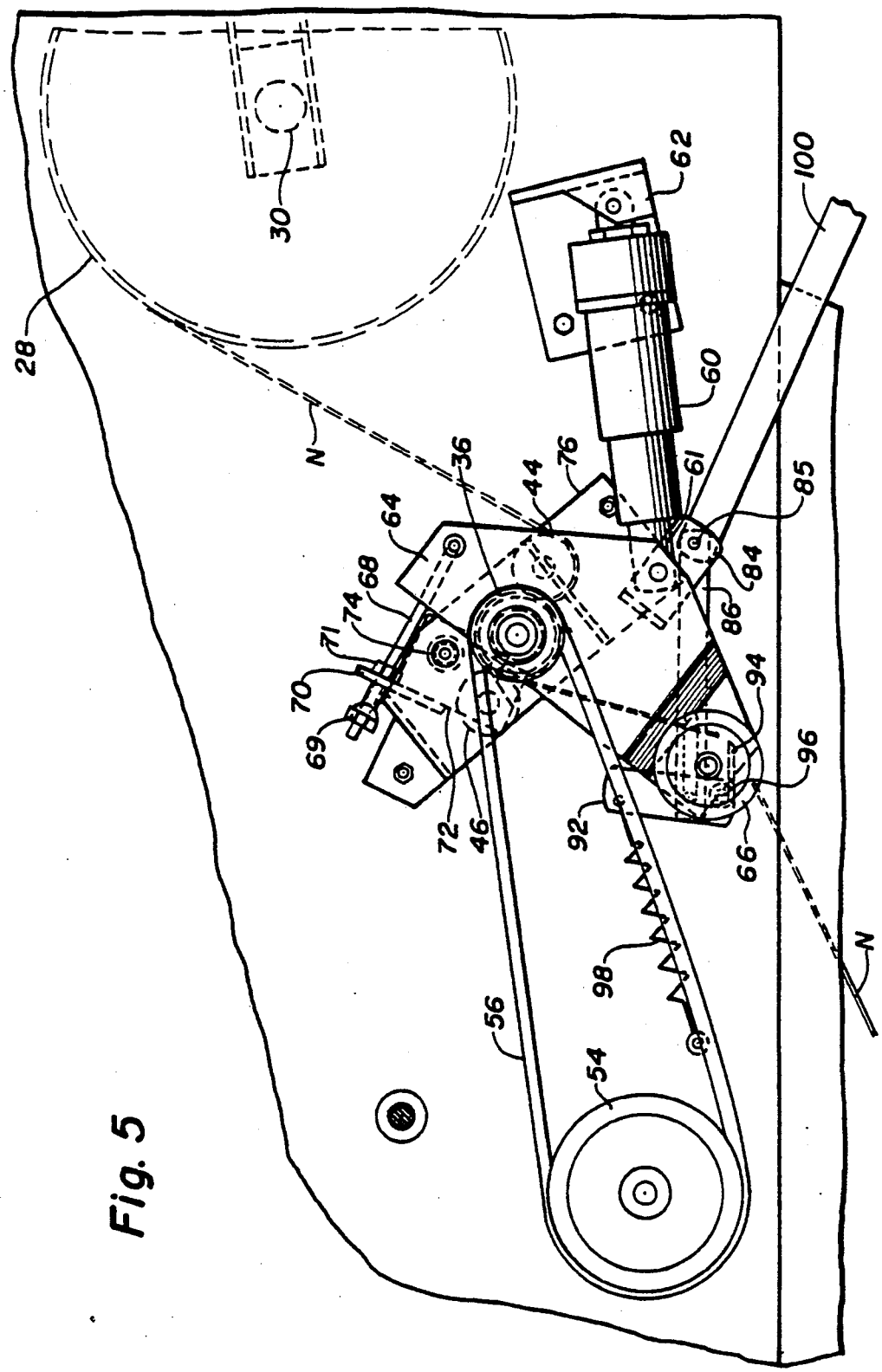
FIG. 5 is an enlarged side elevation view similar to FIG. 2 with the bale wrapping apparatus in a cutting position.

After the netting material has been cut, the electrical actuator 60 is operated again to partially extend the piston 61 causing clockwise rotation of the lever 64 and thereby moving the apparatus 32 from the cutting position of FIG. 5 to the home position of FIG. 2. The feed roller 36 remains latched by the latch arm 72, and the knife 94 is returned to its retracted position. Subsequently, the tailgate 16 is opened and the net wrapped bale is discharged from the round baler 10. The round baler 10 is now ready to form and wrap another bale with the netting material N.

According to the present invention, a link 100 extends along one side of the baler 10 and is pivotally connected at one end to the pin 85 and at the other end to a crank lever 102 which is rotatably supported on a bracket 103 mounted on the main frame 12 of the baler 10. An adjustable link 104 such as a turnbuckle extends generally transverse to the link 100 and is connected between the crank lever 102 and a plate 106 that is rotatably mounted on a shaft 107 carried on the underside of the baler tongue 26. A twine arm 108 is fixed to the plate 106, and a spring 110 is connected between the plate 106 and a bracket 29 on the tongue 26 to normally urge the plate 106 and the twine arm 108 in a clockwise direction as viewed in FIG. 6. Twine T is fed from a supply roll (not shown) carried on the baler 10 through a pair of twine guides 109 mounted on the tongue 26 and then through the twine arm 108 so that it may be dispensed into the baler 10 by the feed roller 36.

When it is desired to convert the round baler 10 for wrapping bales with twine T, the netting material N is removed from the apparatus 32 by releasing the pinch rollers 44, 46 from clamping engagement with the feed roller 36 as described in U.S. Pat. No. 4,790,125 to J. H. Merritt. Next, the twine T is fed from the twine arm 108 upwardly between the pinch roller 44 and the feed roller 36, over the feed roller 36, and then downwardly between the feed roller 36 and the pinch roller 46. Finally, the pinch rollers 44, 46 are returned to clamping engagement with the feed roller 36 as described in the Merritt patent.

Figure 6:
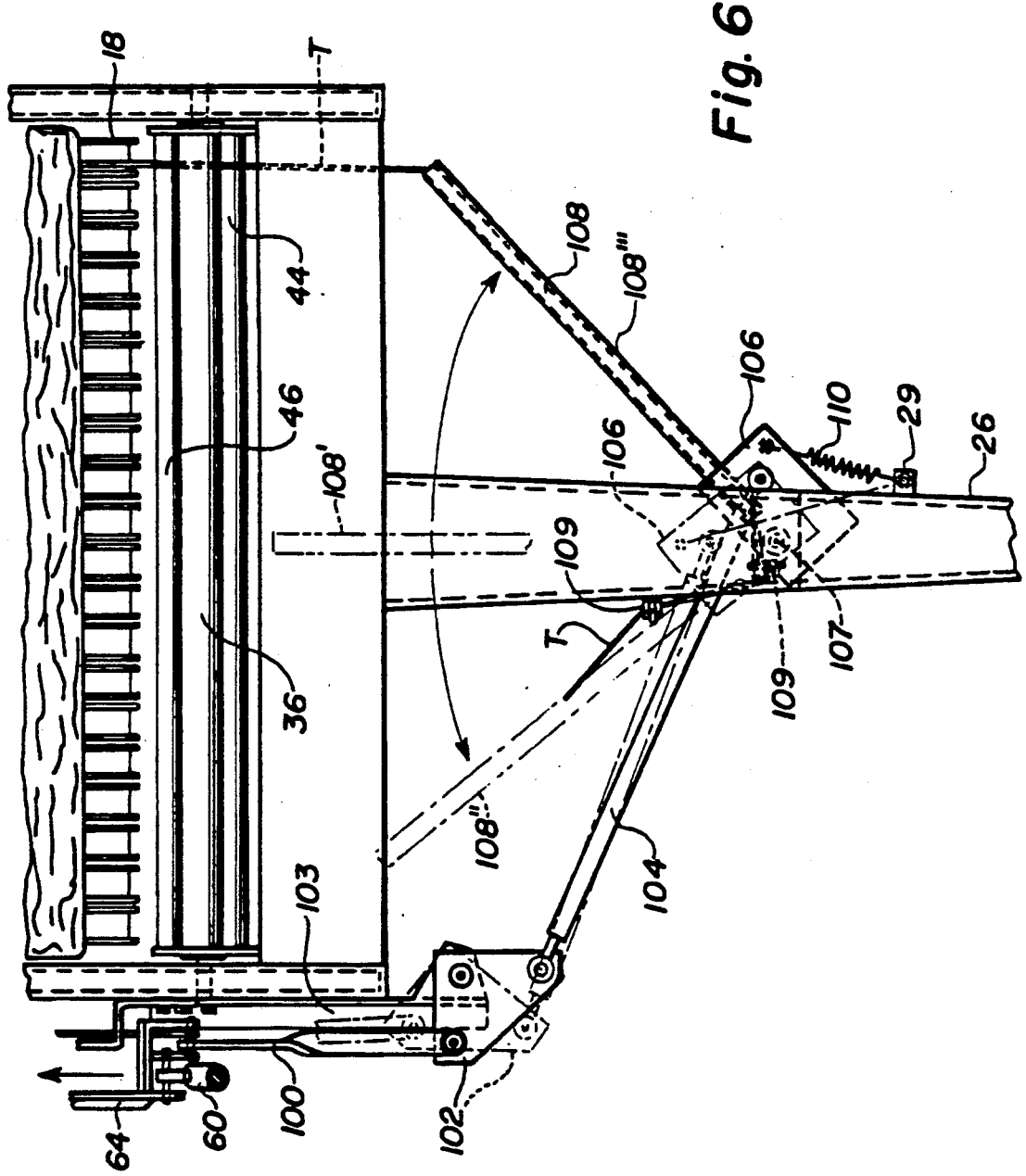
FIG. 6 is a top plan view taken along the lines 6—6 in FIG. 1.

With the apparatus 32 in the home position shown in FIG. 2, the twine arm 108 is located in a rest position 108' shown in FIG. 6. Twine wrapping of a bale formed in the baler 10 is initiated by operating the electrical actuator 60 to fully extend the piston 61 thereby moving the apparatus 32 to the feeding position of FIG. 4 so that the feed roller 36 is driven. This full extension of the piston 61 of the electrical actuator 60 simultaneously pivots the twine arm 108 in a counterclockwise direction as viewed in FIG. 6 to a twine dispensing position 108". The piston 61 of the electrical actuator 60 is then retracted in a plurality of desired increments in order to move the twine arm 108 along the length of the bale and thus back toward a twine cutting position 108''' while the feed roller 36 continues to be driven. This movement of the twine arm 108 results in the twine T being dispensed by the twine arm 108 and fed into the baler 10 by the feed roller 36 where it is wrapped around the bale generally in a spiral manner. When the piston 61 of the electrical actuator 60 is fully retracted, the twine arm 108 is in its twine cutting position 108''' and apparatus 32 will be in the cutting position of FIG. 5 with the feed roller 36 latched while the knife 94 is actuated to cut the twine T. Subsequently, the electrical actuator 60 is operated to partially extend the piston 61 thus returning the apparatus 32 to its home position and simultaneously returning the twine arm 108 to its rest position 108'.

What is claimed is:

1. In a round baler having a bale chamber in which cylindrical bales of crop material are formed and a tongue for attachment to a tractor, apparatus for wrapping said bales comprising:
   a feed roller for feeding twine;
   a knife for cutting twine;
   actuator means for moving said wrapping apparatus between a feeding position wherein said feed roller is driven by drive means to effect feeding of twine while said knife is retracted by link means to prevent cutting of twine and a cutting position wherein said feed roller is latched by latch means to terminate feeding of twine while said knife is actuated by said link means to effect cutting of twine;

a twine arm, rotatably mounted on said tongue and connected to said actuator means, for pivoting movement upon actuation of said actuator means in order to dispense twine that is subsequently fed into said bale chamber by said feed roller;

a first link extending along one side of the baler and connected between said actuator means and a crank lever;

a second link extending generally transverse to said first link and connected between said crank lever and said twine arm; and said first and second links being operated by said actuator means for moving said twine arm between a twine cutting position and a twine dispensing position.

2. In the round baler of claim 1, further comprising a spring normally urging said twine arm toward said twine cutting position.

3. In the round baler of claim 1, wherein said actuator means is extendable and retractable for causing pivotal movement of said twine arm between a rest position, said twine dispensing position and said twine cutting position.

4. In the round baler of claim 1, wherein said second link comprises a turnbuckle.

5. In the round baler of claim 1, further comprising a plate rotatably mounted on a shaft carried on said tongue with said twine arm being fixed to said plane and said second link being connected to said plate.

* * * * *